(No Model.) 2 Sheets—Sheet 2.
F. STITZEL.
SYSTEM FOR ELECTRIC CIRCUITS.
No. 435,105. Patented Aug. 26, 1890.
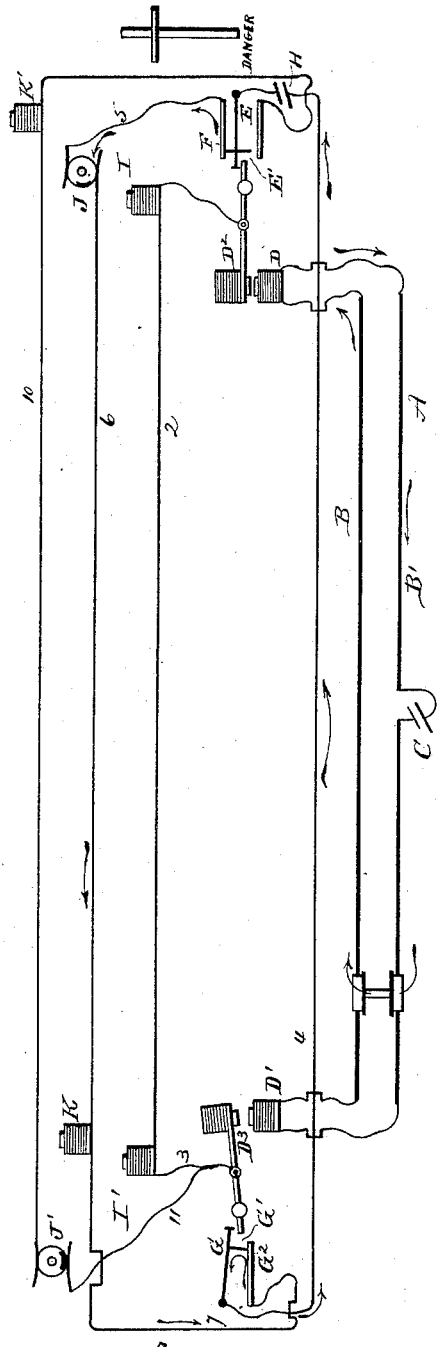
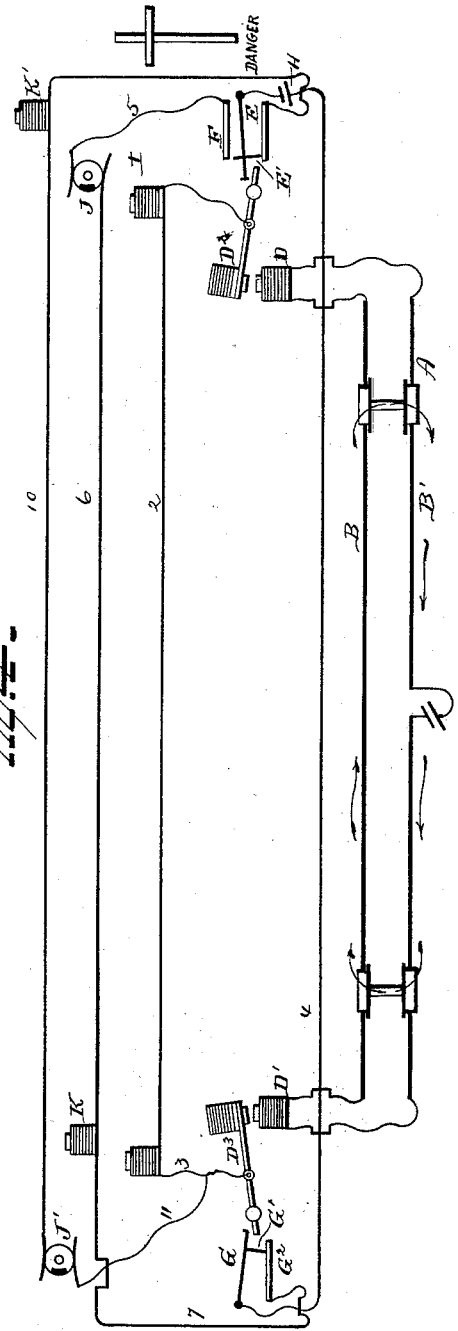
Witnesses
Inventor
F. Stitzel
By his Attorney

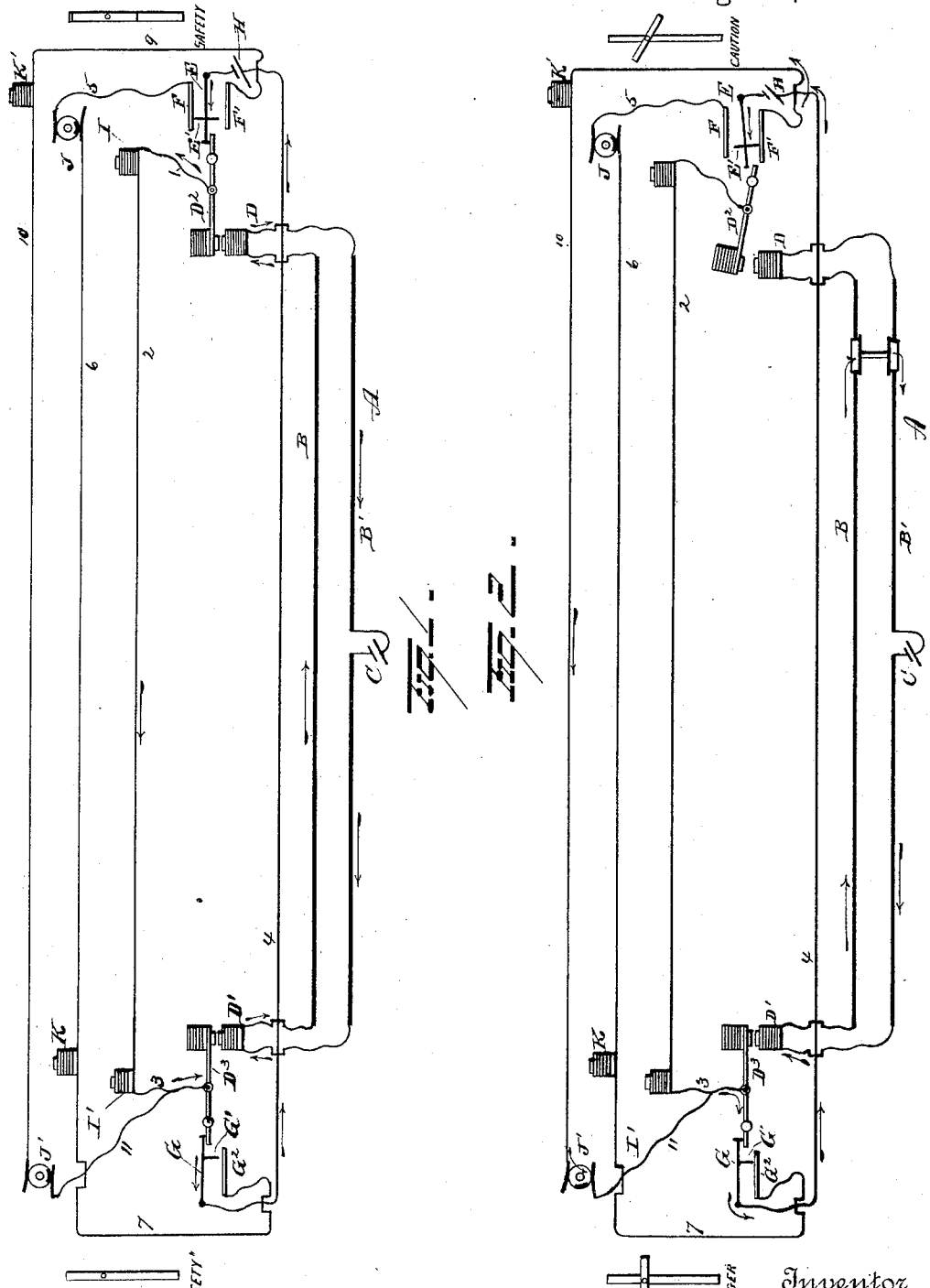

UNITED STATES PATENT OFFICE.

FREDERICK STITZEL, OF LOUISVILLE, KENTUCKY.

SYSTEM FOR ELECTRIC CIRCUITS.

SPECIFICATION forming part of Letters Patent No. 435,105, dated August 26, 1890.

Application filed May 8, 1890. Serial No. 351,078. (No model.)

*To all whom it may concern:*

Be it known that I, FREDERICK STITZEL, a citizen of Louisville, in the county of Jefferson and State of Kentucky, have invented certain new and useful Improvements in Systems of Electric Circuits; and I do hereby declare the following to be a full, clear, and exact description of the invention, such as will enable others skilled in the art to which it appertains to make and use the same.

My invention relates to an improved system of electric circuits and devices for the automatic manipulation of electric semaphores, and is designed more particularly for use in connection with what is known as "block-signaling."

The object of my invention is to produce a simple and efficient system of electrical circuits for electric-railroad signals, by means of which the signals at opposite ends of a block will be simultaneously set to indicate different signals when a train enters the block from either direction.

A further object is to so construct and arrange the circuits that small battery-power will be required.

A further object is to produce a system of electric circuits for the operation of electrical railroad-signals and to construct and arrange the devices for manipulating said circuits that they shall be simple, comprising but few working parts and sure and effectual in operation.

A further object is to so construct the circuits and devices that said circuits shall not be liable to conflict with each other should one of them get out of order, and to so arrange the circuits and devices that the semaphores at opposite ends of a block will be normally set to indicate "safety." When the train enters from either direction, one semaphore will be set to indicate "caution" and the other "danger," and when trains enter both ends of the block at or near the same time from both directions, or the tracks, circuits, or apparatus become deranged, both signals will be set to indicate "danger."

With these objects in view the invention consists in certain novel features of construction and combinations and arrangements of parts and circuits, as hereinafter set forth, and pointed out in the claims.

The system of circuits to which this application relates is intended to be used in connection with the apparatus covered by the application for Letters Patent filed by Charles Weinedel and myself on the 21st day of December, 1889, Serial No. 334,570, and reference to the specification and drawings of said application is to be had for any mechanical features not herein shown and described.

In the accompanying drawings, Figure 1 is a diagrammatical view illustrating the circuits in their normal positions for indicating "safety" at both ends of a block of railroad. Fig. 2 is a similar view illustrating the condition of the circuits when a train enters the block from the right. Fig. 3 is a similar view illustrating the condition of the circuits when a train enters a block from the left. Fig. 4 is a similar view illustrating the condition of the circuits when trains enter both ends of the block at or near the same time.

A represents a block of railroad, and B B' the rails thereof, one of which rails is electrically separated at its center, and the poles of a battery C of suitable size electrically connected to the inner terminals of said separated rail. At each end of the block each rail is electrically connected with a terminal of the helix of relay-magnets D D', which are normally energized by the battery C. At the right-hand end of the block the rear end of the armature-lever $D^2$ of relay D is adapted to engage the end of a pivoted lever E, which latter is provided with a cross-arm E' to form contact-points. The cross-arm E' is maintained normally in contact with a contact-plate F; but when the relay-magnet D is demagnetized and its armature released the arm E' will break contact with the plate F and make contact with a plate F'. At the other end of the block the armature-lever $D^3$ is adapted to engage a pivoted lever G, having a contact-point G', and normally maintain said contact-point elevated and out of contact with a contact-plate $G^2$. The pole of a battery H of suitable size is electrically connected with the pivoted-lever E at the right-hand end of the block, and when the circuits are in their normal positions the current passes through this lever to the armature-lever $D^2$. From the armature-lever the current flows, by wire 1, to the helix of the main semaphore-magnet of the semaphore I at the right-hand end of the block, and from thence by wire 2 to the main semaphore-magnet of the semaphore I' at the opposite end of the block, thence by wire 3 to armature-lever $D^3$, to the lever G, and thence by wire 4 back to the battery. Thus it will be seen that both the track-circuit and the main-semaphore circuit will be normally closed and the signals at both ends of the block maintained at "safety." The plate F is connected by a wire 5 with a normally-open circuit-closer J in the signal apparatus, said closer being also connected by a wire 6 with the helix of a magnet K in the semaphore at the opposite end of the block, said magnet being adapted to control a cautionary signal, as explained in the application above referred to. The other end of the helix of magnet K is connected by a wire 7 with the contact-plate $G^2$ at the left-hand end of the block. The lever G is connected by a wire 4 with the battery at the other end of the block. There is also a caution-magnet K' in the semaphore apparatus at the right-hand end of the block, one end of the helix of which is connected by a wire 9 with the plate F', while the other end of said helix is connected by a wire 10 with the circuit-closer J' in the apparatus at the other end of the block, said circuit-closer J' being also connected by a wire 11 with the armature-lever $D^3$ at the left-hand end of the block.

The circuits and devices being thus arranged with the relay-magnets and main semaphore-magnets in normally-closed circuits to maintain the signals normally at "safety," we will suppose, first, that a train enters the block from the right, as indicated in Fig. 2. The wheels and axles of the cars will short-circuit the battery C and the relay-magnet D will be demagnetized. The armature-lever $D^2$ will separate itself from the pivoted lever E, and thus break the circuit through the main semaphore-magnets, and the signal-blades at both ends of the block will begin to leave the "safety position." In the meantime, however, the contact-point E' of the pivoted lever E has made contact with the contact-plate F', and the circuit-closer J' has connected the wires 10 and 11, whereby the current from the battery H will be shifted from its course through the main semaphore-magnets through the circuit which includes the cautionary magnet K' at the right-hand end of the block A, thus energizing this magnet and causing it to retain the signal-blade at the entrance end of the block at "caution," while the signal-blade at the exit end of the block has continued its movements to "danger." When a train enters the block from the left-hand end of the block, the circuits will be just the reverse to that just described, which reverse arrangement is shown in Fig. 3. Should trains enter both ends of the block at or near the same time, the battery C would be short-circuited from both ends of the block and the relays of the semaphores at both ends of the block would be cut out of circuit. Thus all the circuits would be opened and the signals at both ends of the block would fall to "danger." The same effect would be produced if either the track or the main semaphore circuits be broken accidentally or otherwise.

Having fully described my invention, what I claim as new, and desire to secure by Letters Patent, is—

1. The combination, with the tracks of a railroad-block, of a closed electrical circuit including said tracks and a relay at each end of said block, a main normally-closed circuit through both semaphores and a battery, a normally-open cautionary circuit through each semaphore, and circuit-shifters for automatically shifting said battery out of the main circuit into a cautionary circuit, substantially as set forth.

2. The combination, with the tracks of a railroad-block, of a closed electrical circuit including said tracks and a relay at each end of said block, a main normally-closed circuit through both semaphores and a battery, a normally-open cautionary circuit through each semaphore, including a contact-plate in each semaphore, and a pivoted lever in each semaphore, said levers being held normally out of contact with said contact-plate by the armature-levers of the relays, substantially as set forth.

3. The combination, with the tracks of a railroad-block, one of which is divided at a point between its ends, a battery having its poles connected at the inner ends of the divided track, and a relay at each end of the block included in the track-circuit, of a main normally-closed circuit through both semaphores and a battery, a normally-open cautionary circuit through each semaphore, and circuit-shifters adapted to be controlled by the relays for automatically shifting said battery out of the main circuit into the cautionary circuit, substantially as set forth.

4. The combination, with the tracks of a railroad-block and a semaphore at each end thereof, each semaphore being provided with a main magnet, a cautionary magnet, and a relay, of a normally-closed circuit including the track, a battery, and both relay-magnets, a normally-closed circuit including a battery, the relay-levers, and main semaphore-magnets, two normally-open circuits including the cautionary magnets, and shifting devices for shifting the current from the last-mentioned battery to the circuits, including the cautionary magnets, one at a time, substantially as set forth.

In testimony whereof I have signed this specification in the presence of two subscribing witnesses.

FREDERICK STITZEL.

Witnesses:
H. L. KRIEGER,
JNO. MAAS, Jr.